United States Patent [19]

Croitoriu et al.

[11] Patent Number: 4,930,863
[45] Date of Patent: Jun. 5, 1990

[54] HOLLOW FIBER WAVEGUIDE AND METHOD OF MAKING SAME

[75] Inventors: Natan Croitoriu, Kfar-Saba; Jacob Dror, Tel Aviv; Ephraim Goldenberg, Tel Aviv; David Mendelovic, Tel Aviv; Ganot Israel, Hedera, all of Israel

[73] Assignee: Rauiot University Authority for Applied Research and Industrial Development Ltd., Tel Aviv, Israel

[21] Appl. No.: 341,872

[22] Filed: Apr. 24, 1989

[30] Foreign Application Priority Data

May 6, 1988 [IL] Israel ........................................ 86296

[51] Int. Cl.⁵ .............................................. G02B 6/20
[52] U.S. Cl. ................................ 350/96.32; 350/96.10
[58] Field of Search ............... 350/96.10, 96.29, 96.30, 350/96.32, 96.33, 96.34, 320

[56] References Cited

U.S. PATENT DOCUMENTS

| | | | |
|---|---|---|---|
| 4,009,382 | 2/1977 | Nath | 350/96.32 |
| 4,453,803 | 6/1984 | Hidaka et al. | 350/96.32 |
| 4,652,083 | 3/1987 | Laakmann | 350/96.32 |

Primary Examiner—William L. Sikes
Assistant Examiner—Akm E. Ullah
Attorney, Agent, or Firm—Benjamin J. Barish

[57] ABSTRACT

A hollow fiber waveguide particularly useful for transmitting electromagnetic radiation in the infrared and visible range, comprises a hollow tube, a metal layer on the inner surface of the hollow tube, and a thin dielectric film over the metal layer.

18 Claims, 1 Drawing Sheet

HOLLOW FIBER WAVEGUIDE AND METHOD OF MAKING SAME

BACKGROUND OF THE INVENTION

The present invention relates to fiber waveguides particularly useful for transmitting carbon dioxide laser radiation, or other radiation, e.g., He-Ne laser radiation, in the infrared or visible regions. The invention also relates to a method of making such waveguides Laser radiation, such as produced by carbon dioxide lasers (wavelength=10.6 $\mu$m) is now being extensively used in many fields, including medicine (e.g., a surgical laser), material processing (e.g., cutting and welding equipment), and communication. However, while good fiber waveguides exist for transmitting low amounts of energy particularly in the visible region, there does not presently exist a good waveguide particularly a flexible waveguide, for transmitting relatively high amounts of energy particularly in the infrared region, because of the lack of good transparent materials capable of efficiently transmitting power in this region. This situation has limited the application of carbon dioxide lasers especially in the medical and communication fields.

OBJECTS AND SUMMARY OF THE INVENTION

An object of the present invention is to provide a hollow fiber waveguide useful for transmitting high amounts of energy in the infrared region, particularly mid-infrared region, but also useful in the visible region. Another object of the invention is to provide a method for making such a hollow fiber waveguide.

According to one embodiment of the present invention, there is provided a hollow fiber waveguide particularly useful for transmitting electromagnetic radiation in the infrared and visible range, comprising: a hollow tube; a metal layer on the inner surface of the hollow tube; and a thin dielectric film of silver iodide over said thin metal layer.

Preferably, the metal layer is a thin metal coating of up to 20 microns in thickness, and the thin dielectric film is up to 10 microns in thickness.

The hollow tube may be a flexible plastic, preferably a fluoropolymer; alternatively, it could be rigid, e.g., of quartz, glass or ceramics, or of metal, e.g., of stainless steel.

According to another another embodiment of the invention, there is provided a hollow fiber waveguide particularly useful for transmitting electromagnetic radiation in the infrared and visible range, comprising a hollow flexible tube of stainless steel, a thin layer of copper on the inner surface of the stainless steel hollow tube, and a thin dielectric film of copper oxide over the copper layer.

The invention also provides a method of making hollow waveguides particularly useful for transmitting electromagnetic radiation in the infrared and visible range, comprising: applying to the inner face of a hollow tube a solution of a metal salt, reducing the metal salt by a reducer solution to deposit a thin metal coating on the inner surface, and depositing a dielectric film of an inorganic material on the metal coating.

In one preferred embodiment described below, the metal coating is silver, and the metal halide film is silver iodide. Other embodiments are described wherein the metal coating is copper, and the dielectric film is formed by oxidizing the copper to produce a copper oxide film. The copper oxide may be formed by thermal treatment, or by chemical treatment.

Such waveguides may be used in many fields of science and medicine; for example, it is possible to carry out operations inside a body where the laser energy is transmitted to the target through a hollow fiber (flexible or rigid). Such waveguides may also be used to transmit heat energy from an oven, or other hot source, to a detector, or to transmit multi or single mode pulses (infrared or other wavelenght) to another device.

Further features and advantages will be apparent from the description below.

BRIEF DESCRIPTION OF THE DRAWINGS

The invention is herein described, by way of example only, with reference to a number of examples described below, and to the accompanying drawing schematically illustrating one form of hollow fiber waveguide constructed in accordance with the present invention.

DESCRIPTION OF PREFERRED EMBODIMENTS

Figure 1:
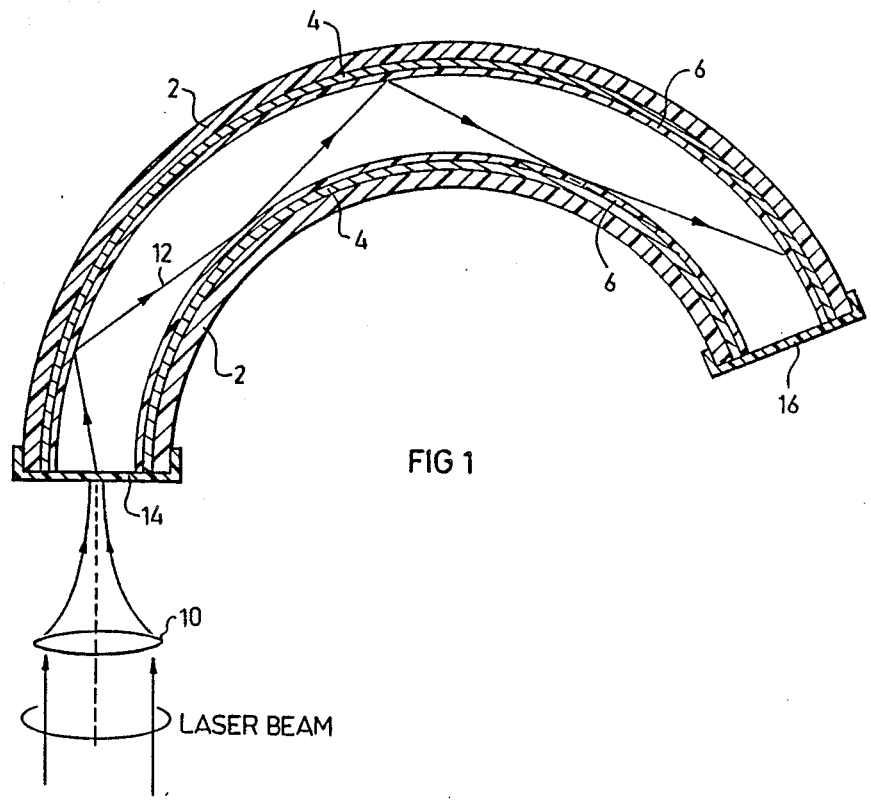

The drawing diagrammatically illustrates a hollow fiber waveguide for transmitting radiation energy in the infrared and visible regions particularly useful with a carbon dioxide laser having a wavelength of 10.6 $\mu$m. The hollow fiber waveguide comprises a hollow, flexible, plastic tube 2, a metallic coating 4 on the inner surface of the tube, and a dielectric film 6 on the metal coating.

As also shown in the drawing such a hollow fiber waveguide may be used for transmitting a laser beam, schematically indicated at 8. The beam, after focusing by lens 10, is directed into one end of the waveguide and is transmitted through the waveguide by internal reflection as shown by the arrows 12, to the opposite end of the waveguide, even though the waveguide is bent to a relatively small radius of curvature. The ends of the waveguide may be closed by transparent windows or films or lenses 14, 16, to prevent the entry of dirt. The windows or films or lenses 14, 16 may be thin transparent plastic film welded over the end of the tube, or a transparent inorganic material e.g. ZnSe glued to the tube.

Another possibility is to use a conical type optical element or a lens 10 at the inlet of the fiber waveguide to direct the laser beam into the fiber waveguide; and at the outlet to use a similar conical element or lens for refocussing the beam and thereby to increase the energy density at the outlet.

Such a hollow fiber waveguide is particularly useful for transmitting the beam of a carbon dioxide laser or other type of electromagnetic radiation to a desired location, e.g., for surgical, communication or for material processing applications.

In one preferred example, the hollow plastic tube 2 may be of flexible polyethylene having an internal diameter of 3 mm, an external diameter of 6 mm. Other types of plastic materials could be used, including polypropylene, polystyrene, fluoropolymers, polyamides (e.g., nylon 6, nylon 11), polyurethanes, natural or synthetic rubber, silicone rubber and polyvinyl chloride. The dimensions of the hollow tube can be varied; also its cross-section can have different geometrical shapes, besides the circular shape illustrated, including square, rectangular or ellipsoidal.

The metal coating 4 applied on the inner surface of the hollow plastic tube 2 is preferably of silver, but could be of other metals, including nickel, copper, gold and palladium. Its thickness if preferably up to 10 microns.

The hollow waveguide may also be of rigid material, such as quartz, or of metal, such as stainless steel. When metal is used, particularly stainless steel, it is preferred to apply a coating of copper, by a known "electroless" technique, to the inner surface of the tube, and then to oxidize the copper, either by heat treatment or by chemical treatment, to produce a thin copper oxide film serving as the dielectric film.

Following are several examples for producing the hollow fiber waveguide according to the invention.

EXAMPLE 1

The hollow plastic tube 2 is of polyethylene having an internal diameter of 3 mm, an outer diameter of 6 mm, and a length of 700 mm.

Its inner surface is first etched with a solution of sulphochromic acid at room temperature for a period of 20 minutes; alternatively, a mixture of sulphochromic acid and phosphoric acid at a temperature of 500° C. may be used, in which case the etching period is reduced to about 3 minutes.

Following the application of the etching agent, the inner surface of the hollow plastic tube 2 is then rinsed with distilled or deionized water at room temperature for one minute.

The inner surface of the hollow plastic tube 2 is then subjected to dilute hydrochloric acid at room temperature for about 3 minutes, to effect acidification and $Cr^6$ neutralization. The inner surface is then subjected to a sensitizing agent comprising a solution of $SnCl_2/HCl$ at room temperature for 5 minutes; rinsed with distilled or deionized water at room temperature for 1 minute; then subjected to an activating agent comprising a solution of $PdCl_2/HCl$ at room temperature for 3 minutes; and then again rinsed with distilled or deionized water at room temperature for 1 minute.

A mixture of a silver-plating solution and a reducer solution is then circulated through the hollow plastic tube in contact with its inner surface. Following is one example of the silver-plating solution, and of the reducer solution which can be used

Silver-Plating Solution

The following materials were dissolved in small amounts of distilled or deionized water: 5 gr $AgNO_3$, plus 30 mg sodium dodecylbenzenesulfonate, plus 25 ml of 28% ammonia solution. To this solution was added pure or diluted acetic acid so that the final pH was reduced to 6–9. After the pH adjustment, the final volume of the solution was increased to 100 ml by adding distilled or deionized water. The silver concentration was Ca 0.3 moles/$dm^3$.

Concentrations of Ca 0.1–1.0 moles/$dm^3$ silver could generally be used, with the understanding that the ammonia/acetic acid concentration and the reducer concentration would be adjusted accordingly.

It is possible to add additives by dissolving water-soluble polymeric materials (e.g., polyvinyl pirrolidone; polyethylene glycoles; polyacrylic acid); these additives tend to improve the adhesion of the silver layer to the polymeric substrate. The silver-plating solution is stable and can be stored for up to a week without significant loss of activity.

Reducer Solution

The reducer solution was prepared by diluting a 3 molar stock solution of $N_2H_4:H_2O$ (hydrazine hydrate) down to 0.3 moles/$dm^3$ solution. Other reducers that may be used include inverted sugars or formaldehyde.

25 ml of the above silver-plating solution were mixed with 6 ml of the above reducer solution, and the mixture was diluted to 100 ml. The reducer solution was added in small amounts to the silver-plate solution over a period of 5–10 minutes. The mixture was brought into contact with the inner surface of the hollow plastic tube 2 at a temperature of about room temperature or up to 30° C. for 5–10 minutes. The transfer rates of the solution into the hollow plastic tube were low, approximately 5 mm/min. The deposition initially took place on the activated inner surface of the hollow plastic tube, and thus made the process purely electroless.

Following the deposition of the silver-plating 4 on the inner surface of the hollow plastic tube 2, the tube was rinsed with distilled or deionized water at room temperature for 1 minute.

The dielectric layer 6 was then deposited on the inner surface of the silver layer 4. This was done by subjecting the inner surface of the silver coating into contact, for a few seconds at room temperature, with a water solution containing 10% (W/W) polyvinyl pirrolidone and 0.1–0.5% (W/W) iodine.

The interior of the hollow plastic tube was then rinsed with distilled or deionized water at room temperature for a few seconds, or with carbontetrachloride. Following this, the transparent windows 14, 16 may be applied by welding polyethylene film to the ends of the tube, or gluing an inorganic transparent window or lens to the tube.

The above process produced a hollow fiber waveguide having an outer diameter of 6 mm, an inner diameter of 3 mm, a metallic layer of 2 microns, and a dielectric layer of 10 microns. Such a hollow fiber was found to be very flexible and capable of transmitting the laser beam of a carbon dioxide laser having a wavelength of 10.6 $\mu$m. The energy transmission through the waveguide was dependent on its length, radius of curvature, and the location of the focus of the beam. The transmission decreased with the decreasing radius of curvature, reaching an almost constant value of 30–35% at a radius of curvature of 150 mm, with a tube length of 500 mm.

Following are additional examples of making hollow waveguides, of both the flexible and rigid types, in accordance with the present invention:

EXAMPLE 2

A flexible plastic tube is used made of fluoropolymers known by their trade names: Teflon, PTFE (Poly-Tetra-Fluoro-Ethylene), FEP (Fluorinated-Ethylene-Propylene), PFA (Per-Fluoro-Alkoxy). Other types of plastic tubes may also be used, e.g., polyethylene, polypropylene, nylon 6, nylon 11, silicone rubber, rubber, P.V.C., and polystyrene. The length of the tube in this example is 1.2 meters; the inner diameter (ID) is 2.4 mm; and the outer diameter (OD) 3.2 mm. The ID and OD values may vary between fraction of mms and up to tens of mms. The tube is processed as follows:

1. Stretching and straightening: The tube (sold in rolls) is cut into the appropriate length, and is then subjected to stretching by pulling it in a vertical form with a 3–5 kg. weight for a few hours.

2. Etching I: The etching solution is a Na Naphthalene solution in Tetrahydrofuran with a concentration range of 0.8–1.8 moles/dm$^3$ (preferably 1.2 moles/dm$^3$). The inner walls of the tubes are brought into contact with the solution for periods of 0.5–5 minutes (depending on the solution age and concentration). The tube is then washed with tetrahydrofuran, acetone and deionized water (DIW).

3. Etching II: The inner walls of the tube are brought to contact with a sulfochromic acid solution for half a minute at room temperature, washed with DIW, subjected to diluted hydrochloric acid (HCL) for 3 minutes, and washed again with DIW.

4. Sensitization: The inner surface of the tube is brought into contact with SnCl$_2$/HCl solution (SnCl$_2$–70 gr/dm$^3$, HCl-40 gr of HCl (con)/dm$^3$) for 5–20 minutes at room temperature and then rinsed with DIW.

5. Activation: The inner surface of the tube is reacted with a PdCl$_2$/HCl solution (1 gr/dm$^3$ of PdCl$_2$, 5 ml/dm$^3$ of HCl (con) for 5–20 minutes at room temperature and then rinsed (very thoroughly) with DIW. Other known post activation methods, e.g., rinsing with HCl, NaOH or E.D.T.A. solutions, may also be used.

6. Silver plating: The now activated inner surface of the tube is brought into contact with a silver-plating solution and a reducer solution which are prepared as follows:

Silver-Plating Solution: The following materials are dissolved (in this order) in a small amount of water: 5 gr AgNO$_3$, 30 mg of dodecyl benzen sulfonic acid sodium salt, 30 ml of 28% ammonia solution. To the resulting solution, pure or diluted organic or inorganic acids are added (preferably acetic acid) so that the final pH is reduced to 7.5–10. The volume of the solution is then increased to 100 ml by adding DIW (Ag$^+$concentration is Ca 0.3 mole/dm$^3$). It is also possible to dissolve the silver salt and buffer solution in other organic polar solvents as dimethylsulfoxide, ethylene glycol, hexamethylene phosphoramide, or mixtures of such polar solvents with water in various proportions. Concentrations of Ca 0.1–1.2 moles/dm$^3$ Ag$^+$ may generally be used, in which case the ammonia, acid and reducer concentrations should be changed accordingly. The silver solution is filtered through a filter-paper 24 hours after preparation and only then it is ready for use. The silver solution is very stable and insensitive to light and can be stored even in stoppered clear glassware for months without lose of activity.

Reducer Solution: This solution is prepared by diluting a 3 moles/dm$^3$ stock solution of hydrazine hydrate (NH$_2$HN$_2$·H$_2$O) to Ca 0.3 moles/dm$^3$ solution; other reducers, e.g., inverted sugars or fomaldehyde, may also be used.

Silver Plating Process: 25 ml of the silver-plating solution was diluted to 50 ml by DIW. 10 ml of the reducer solution are diluted to 20 ml and added very slowly over a period of 10–20 minutes to the silver solution with constant stirring. The solution should be in contact with the inner walls of the tube (or tubes) all the time. This may be done in room temperature. The deposition initially takes place only on the activated tube surface and thus makes the reaction purely "electroless".

The above described solution may be used to plate up to 50 cm$^2$ of plastic surface. Several of the surface preparation solutions may be recycled. The silver plated tubes are rinsed with DIW and dried in a stream of inert gas (N$_2$) for 20 minutes.

Dielectric layer preparation: The dried, silver plated tube is brought into contact with a halogen element solution (e.g., 0.0125–7% (W/W), but preferably 1.25% (W/W) I$_2$ crystals dissolved in CCl$_4$ or the same concentration of Br$_2$) for 0.05–10 minutes (preferably 1–2 minutes) and is then washed consecutively with CCl$_4$ and acetone, and dried in a stream of inert gas (N$_2$) for 20 minutes to produce a silver halide.

The above stated process was used to produce a hollow fiber waveguide with metallic layer of up to 2 um thickness and a dielectric layer of up to 2 um thickness. The waveguide was very flexible and capable to transmit CO$_2$ laser energy wavelength (wavelength=10.6 $\mu$m); energy transmission depends on the length, radius of the tube, radius of curvature and the coupling mode. The transmission for a 0.7 meters long fiber of OD=3.2 mm, ID=2.4 mm was 80% when straight, and decreased to 60% when the radius of curvature was 14 cm. This means that the influence of the radius of curvature on the transmission is very modest. The transmission when measured right after preparation was somewhat lower and slowly increased with time reaching the above stated values after 1–3 days. There were no changes in transmission with time, and the fibers could be stored in any position straight or bent without loss of transmission.

It is also possible to block the end of the tube (which is not coupled to the laser) with a transparent (to infrared and visible light) plastic film (e.g., polyethylene) which may be soldered to the tube, or with a ZnSe window glued to the tube.

EXAMPLE 3

A rigid quartz tube with inner diameter (ID) of 2 mm and outer diameter (OD) of 4 mm is processed as follows:

1. etch with hot (70° C.) sulfochromic acid for 10 minutes;
2. rinse with deionized water (D.I.W.);
3. etch with diluted 1% (W/W) HF for 10 minutes at room temperature (RT);
4. rinse with D.I.W.;
5. sensitize with SnCl$_2$HCl solution (the same as in Examples 1, 2) for 20 minutes;
6. rinse with D.I.W.;
7. activate with PdCl$_2$/HCl solution (the same as in Examples 1, 2) at R.T. for 20 minutes.
8. rinse with D.I.W.;
9. deposit silver according to Example 2;
10. rinse with D.I.W. and dry as in Example 2; and
11. prepare the dielectric layer according to Example 2.

The above procedure performed on a 60 cm long quartz tube produced a waveguide which could transmit up to 90% of the CO$_2$ laser energy.

EXAMPLE 4

A tube made of stainless steel with ID of 1.5 mm, OD of 2 mm, is processed as follows:

1. etch with cold 0.5% (W/W) solution of HCl);
2. deposit, on its inner face, a coating of copper by using any one of the known "electroless" copper deposition techniques; and
3. heat in an oven at 190° C. for 3–5 hours under air, to convert the outer surface of the copper to copper oxide, serving as the inorganic dielectric film.

EXAMPLE 5

The same procedure as in Example 4, except that, instead of converting the copper to an oxide by a heat treatment, the copper is converted to an oxide by a chemical treatment, as follows: bring the inner surface of the copper coated on the inner surface of the steel tube into contact with a solution of 2% (W/W) $K_2S_2O_8$, 5% (W/W) NaOH at 70° C. for 10–40 minutes, and then rinse with D.I.W. The tube may then be optionally heated for 1–5 hours at 190° C. under air.

While the invention has been described with respect to several preferred embodiments, it will be appreciated that many other variations, modifications and applications of the invention may be made.

What is claimed is:

1. A hollow fiber waveguide particularly useful for transmitting electromagnetic radiation in the infrared and visible range, comprising: a hollow tube; a metal layer on the inner surface of the hollow tube; and a thin dielectric film of silver iodide over said metal layer.

2. The waveguide according to claim 1, wherein said metal layer is a thin metal coating of up to 20 microns in thickness, and said thin dielectric film is up to 10 microns in thickness.

3. The waveguide according to claim 1, wherein said metal coating is of silver.

4. The waveguide according to claim 1, wherein said hollow tube is a flexible plastic.

5. The waveguide according to claim 5, wherein said hollow tube is a fluoropolymer.

6. The waveguide according to claim 1, wherein said hollow tube is quartz, glass or ceramic.

7. A method of making a hollow waveguide particularly useful for transmitting electromagnetic radiation in the infrared and visible range, comprising: depositing a thin metal coating on the inner face of a hollow tube by applying to said inner face a solution of a metal salt, and reducing said metal salt by a reducer solution; and depositing a dielectric film of an inorganic material on said metal coating.

8. The method according to claim 7, wherein said metal salt solution is a silver salt solution having a molar concentration of 0.1–1.0 moles/$dm^3$.

9. The method according to claim 7, wherein said metal salt is silver nitrate.

10. The method according to claim 7, wherein said metal salt solution further includes a buffer of ammonia and acid having a pH of 7.5 to 10.

11. The method according to claim 7, wherein the reducer solution is hydrazine hydrate.

12. The method according to claim 7, wherein said dielectric film is deposited on said metal coating by treating the metal coating with a halogen to form a metal halide film.

13. The method according to claim 12, wherein said metal coating is silver, and said metal halide film is silver iodide.

14. The method according to claim 7, wherein said metal metal coating is copper, and said dielectric film is formed by oxidizing the copper to produce a copper oxide film.

15. The method according to claim 14, wherein said copper coating is oxidized by a thermal treatment.

16. The method according to claim 14, wherein said copper coating is oxidized by a chemical treatment.

17. A hollow fiber waveguide particularly useful for transmitting electromagnetic radiation in the infrared and visible range, comprising: a hollow flexible tube of stainless steel; a thin layer of copper on the inner surface of the stainless steel tube; and a thin dielectric film of copper oxide over said copper layer.

18. The waveguide according to claim 17, wherein said copper layer is up to 20 microns in thickness, and said copper oxide film is up to 10 microns in thickness.

* * * * *